(12) United States Patent
Schmidt et al.

(10) Patent No.: US 8,684,413 B2
(45) Date of Patent: Apr. 1, 2014

(54) PRETENSIONING DEVICE FOR A SAFETY BELT

(75) Inventors: Thomas Schmidt, Timmerndorfer Strand (DE); Martin Schmidt, Elmshorn (DE); Christian Fischer, Hamburg (DE); Michael Pech, Hamburg (DE); Matthias Steinberg, Kiebitzreihe (DE); Tobias Voss, Klein Nordende (DE)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/643,125

(22) PCT Filed: Mar. 3, 2011

(86) PCT No.: PCT/EP2011/001057
§ 371 (c)(1),
(2), (4) Date: Oct. 24, 2012

(87) PCT Pub. No.: WO2011/134567
PCT Pub. Date: Nov. 3, 2011

(65) Prior Publication Data
US 2013/0038047 A1 Feb. 14, 2013

(30) Foreign Application Priority Data

Apr. 27, 2010 (DE) .......................... 10 2010 018 512

(51) Int. Cl.
*B60R 22/405* (2006.01)
(52) U.S. Cl.
USPC ............ 280/806; 280/805; 297/478; 297/480
(58) Field of Classification Search
USPC ................ 280/801.2, 805, 806; 297/478, 480
See application file for complete search history.

(56) References Cited

U.S. PATENT DOCUMENTS 2,441,719 A * 5/1948 Potter .......................... 74/502.3
3,304,878 A * 2/1967 Sabre .............................. 415/72
(Continued)

FOREIGN PATENT DOCUMENTS

DE 29 31 164 A 2/1981
DE 195 45 795 C1 3/1997
(Continued)

OTHER PUBLICATIONS

German Search Report—DE 10 2009 051 451.1-22—May 19, 2011.
(Continued)

*Primary Examiner* — Nicole Verley
(74) *Attorney, Agent, or Firm* — Brinks Gilson & Lione

(57) ABSTRACT

A pretensioning device (10) for a safety belt, of a motor vehicle, having a gas generator (17), a piston (21) guided in a tube (16), which closes a pressure area (20) in the tube (16) that is pressurized by the gas generator (17) whereupon the piston (21) is able to move in a pretensioning movement which is able to be conveyed to the safety belt by means of an inertia body (19*a*) resting on a front face (9) of the piston (21). The piston (21) forms a pass-through opening (1) releasable upon exceeding of a predetermined pressure and a recess (26) is provided in the front face (9) with an inertia body (19*a*) resting thereon, so that a flow connection is created from the pass-through opening (1) to the area (25) located behind the piston (21) in the direction of the pretensioning movement (S).

17 Claims, 5 Drawing Sheets

(56) References Cited

U.S. PATENT DOCUMENTS

| | | | |
|---|---|---|---|
| 3,965,802 A * | 6/1976 | Jacobs | 187/272 |
| 4,356,737 A * | 11/1982 | Burghoff et al. | 74/502.5 |
| 4,399,655 A * | 8/1983 | Fohl | 60/637 |
| 4,442,674 A * | 4/1984 | Fohl | 60/632 |
| 4,444,010 A | 4/1984 | Bendler | |
| 4,860,698 A | 8/1989 | Patrichi et al. | |
| 5,037,134 A | 8/1991 | Tabata | |
| 5,690,295 A | 11/1997 | Steinberg et al. | |
| 6,325,416 B1 | 12/2001 | Wier | |
| 6,343,758 B1 | 2/2002 | Abe et al. | |
| 6,345,504 B1 | 2/2002 | Takehara et al. | |
| 6,363,722 B1 | 4/2002 | Takehara et al. | |
| 6,371,512 B1 | 4/2002 | Asano et al. | |
| 6,446,897 B1 * | 9/2002 | Arima et al. | 242/374 |
| 6,450,435 B2 * | 9/2002 | Junker et al. | 242/374 |
| 6,450,529 B1 | 9/2002 | Kalandek et al. | |
| 6,481,743 B1 | 11/2002 | Tobe et al. | |
| 6,575,498 B2 | 6/2003 | Nagata et al. | |
| 6,722,600 B2 * | 4/2004 | Hamaue et al. | 242/374 |
| 6,808,199 B2 | 10/2004 | Saderholm et al. | |
| 6,830,262 B2 | 12/2004 | Sonnenberg et al. | |
| 6,910,653 B2 * | 6/2005 | Tanji | 242/390.8 |
| 7,401,805 B2 | 7/2008 | Coon et al. | |
| 7,661,705 B2 | 2/2010 | Jacobsson et al. | |
| 7,770,918 B2 | 8/2010 | Berntsson et al. | |
| 8,210,569 B2 * | 7/2012 | Eberle et al. | 280/806 |
| 8,262,008 B2 * | 9/2012 | Shiotani et al. | 242/374 |
| 8,371,613 B2 * | 2/2013 | Hodatsu et al. | 280/806 |
| 2002/0180190 A1 | 12/2002 | Tobe et al. | |
| 2003/0010200 A1 | 1/2003 | Reithofer | |
| 2004/0007857 A1 | 1/2004 | Sonnenberg et al. | |
| 2006/0119084 A1 | 6/2006 | Coon et al. | |
| 2006/0197316 A1 | 9/2006 | Watanabe | |
| 2006/0213191 A1 * | 9/2006 | Borg et al. | 60/512 |
| 2007/0251616 A1 * | 11/2007 | Furusawa et al. | 149/37 |
| 2007/0296189 A1 | 12/2007 | Berntsson et al. | |
| 2011/0140502 A1 * | 6/2011 | Shiotani et al. | 297/475 |
| 2012/0211578 A1 * | 8/2012 | Fischer et al. | 242/374 |
| 2012/0256407 A1 * | 10/2012 | Tomita et al. | 280/806 |
| 2013/0038047 A1 | 2/2013 | Schmidt et al. | |
| 2013/0062450 A1 * | 3/2013 | Fischer et al. | 242/374 |

FOREIGN PATENT DOCUMENTS

| | | |
|---|---|---|
| DE | 196 02 549 A1 | 8/1998 |
| DE | 198 37 927 A1 | 3/2000 |
| DE | 199 39 499 A1 | 2/2001 |
| DE | 100 27 212 A1 | 12/2001 |
| DE | 102 12 912 A1 | 10/2002 |
| DE | 10331133 | 1/2004 |
| DE | 103 17 192 A1 | 12/2004 |
| DE | 102004024623 A1 | 12/2005 |
| DE | 102004045977 A1 | 3/2006 |
| DE | 102005011676 | 11/2006 |
| DE | 100 66 249 B4 | 7/2007 |
| DE | 10 2007 028 980 A1 | 1/2009 |
| DE | 10 2008 032371 A1 | 9/2009 |
| DE | 102008053229 A1 | 5/2010 |
| EP | 0 780 272 A2 | 6/1997 |
| EP | 0 980 796 A2 | 2/2000 |
| EP | 1286866 AO | 12/2001 |
| EP | 1637408 | 3/2006 |
| WO | WO 2009/079996 A2 | 7/2009 |

OTHER PUBLICATIONS

PCT/EP2007/008243—Publication with International Search Report—Mar. 6, 2008.
PCT/EP2007/010847—Publication with International Search Report—Mar. 31, 2008.
PCT/EP2008/004644—International Search Report—Dec. 31, 2008.
PCT/EP2010/006227—International Search Report—Jan. 21, 2011.
PCT/EP2010/007051—International Search Report—Mar. 10, 2011.
PCT International Search Report—May 30, 2011.
German Search Report—Jan. 18, 2011.

* cited by examiner

PRETENSIONING DEVICE FOR A SAFETY BELT

CROSS-REFERENCE TO RELATED APPLICATIONS

This application claims priority to German Patent Application No. 10 201 0 018 512.4, filed Apr. 27, 2010 and PCT/EP2011/001057, filed Mar. 3, 2011.

FIELD OF THE INVENTION

The invention relates to a pyrotechnic pretensioning device for a safety belt, in particular for use in a motor vehicle.

BACKGROUND OF THE INVENTION

The basic problem in a pretensioning device is that the pressure relationships in a pretentioner tube produced by gas from a pyrotechnic gas generator change greatly during the pretensioning process. Especially high pressure pressure peaks can lead to the parts of the pretensioning device being damaged or the movement sequence of the pretensioning device being impeded.

Already known from DE 195 45 795 C1 is a pyrotechnical driving device with an overpressure safety by means of which an exceeding of a predetermined pressure is prevented in the tube of the pretensioning device. In this solution, an opening is provided in the pretensioner tube in the area of the gas generator and the gas generator is provided with a gas generator casing. Upon exceeding of a predetermined pressure, the wall of the gas generator casing is pressed into the opening of the tube and is thereby so transformed that it tears apart and releases the opening.

A disadvantage of the above mentioned solution is that the pressure is released outward outside the tube and thereby a hot jet or even a flash is released whereupon adjacent parts can be damaged.

Known from DE 102 12 912 B4 is, for example, a pretensioning device with a piston-cylinder arrangement in which a pressure release valve is provided in the piston by means of which a pressure reduction from the pressure chamber in front of the piston is facilitated. In the pretensioning device described therein, the driving movement of the piston is conveyed by means of a gear rack which engages into a geared wheel connected with the belt shaft. A release of the pressure via the pressure release opening described therein presupposes that a free space is available in the direction of movement of the driving device behind the piston in which the pressure can escape from the pressure chamber.

In a pretensioning device known from DE 195 45 795 C1 such a solution is basically not possible, since the drive device to convey the pretensioning movement is formed here by a powered solid body linkage which rests directly on the piston with its first inertia body. The free space required for the solution known from DE 102 12 912 B4 is constricted here at least by the first inertia body. In addition there is also the disadvantage that the first inertia body rests with a very high pressure on the piston during the drive movement of the piston and as a result an opening present in the piston would close.

The object of this invention is to create a pretensioning device with an inertia body linkage powered by a piston in which the overpressure from the pressure area located in front of the piston can be reduced abruptly, upon exceeding of a predetermined pressure, without endangering the parts in the vicinity of the pretensioning device.

The object is attained in the invention by means of the pretensioning device described by the specification, and the associated figures.

To attain the object, the invention proposes that the piston of the pretensioner feature a pass-through opening releasable upon exceeding of a predetermined pressure, and a recess—with an inertia body resting thereon—is provided on the front side through which a gas flow connection is created from the pass-through opening to the space located behind the piston in the direction of pretensioning movement.

The advantage of the inventive solution can be seen in that by means of the flow connection so created, the pressure from the pressure area can be reduced, even with an inertia body resting on the front side of the piston, namely during the pretensioning movement or with a blocked pretensioning movement. The pressure is intentionally not released into the surroundings, which is the case with the known prior art, so that parts adjacent to the pretensioning device are not endangered by the released pressure.

It is further proposed that at least two recesses be provided in the front area. The advantage from the placement of two or more recesses in the front face is that the pressure change acting on the inertia body because of the flow of the pressurized gas can be made uniform so that the inertia body also does not lose contact on one side with the front face during the pressure release and possibly execute a tipping movement.

The smoothest possible change of the pressure forces acting on the inertia bodies can be attained in that the recesses are dimensioned radially symmetrical and/or identical.

It has been shown in particular that a smooth and possibly fast pressure reduction can be obtained by the pass-through opening being placed in the middle of the front face of the piston and the recess running radially from the pass-through opening to the outer edge of the piston.

It is also proposed that the area of the recess(es) amounts to 15-50% of the surface of the total surface of the piston front face. By means of the proposed portion of the area of the recesses of the front face it is guaranteed that the pressure decreases quickly and the inertia body nonetheless rests on a sufficient bearing surface on the front face of the piston without the danger existing that the part of the front face on which the piston rests is melted or destroyed because of the excessively high stress from the temperatures acting thereon. The portion of the surface of the recesses thereby relates to the area of the front face of the piston on which the first inertial body rests without recesses.

It is also proposed that the piston exhibits a higher surface hardness in the area of the front face compared to the other surface. The greater surface hardness of the front face prevents the deformation of the front face in the area of the bearing surface of the inertia body and keeps the recesses from being closed due to deformation of the material. The greater surface hardness can be obtained either by a surface treatment in the area of the front face or also by a specific softening of the surface in the area of the sealing segment resting on the tube. It is thereby important that the piston meets both the requirements regarding sealing with respect to the tube as well as also regarding the force transfer across the front face.

Another preferred embodiment of the invention can be seen in the fact that the piston is constructed in at least two parts and exhibits a first part which rests on the interior wall of the tube and exhibits a second part on which the front face is placed, and the second part exhibits a greater strength than the first part. By means of the two-part design of the piston, the piston can be so constructed that it features the needed strength in the area of force transfer and simultaneously the necessary elasticity in the area of its sealing area, which is especially advantageous when the piston is guided in a curved pretensioner tube during the pretensioning process and a slight movement relative to the tube wall can be executed in the course of the curved tube.

In this case an especially cost-effective solution can be realized in that the second part of the piston is constructed from a deep-drawn part. The second part can thereby be constructed cost-effectively in mass production, whereby it is especially advantageous that the shaping of the recesses can also occur in the deep-drawing process.

It is further proposed that between the first and the second part an insert is provided which closes the pass-through opening. The advantage of the use of the insert can be seen in that with regard to the selection of material and the individual dimensioning it can be so designed that it is destroyed upon exceeding of a previously determined pressure difference between the pressure prevailing in the pressure area and the pressure in the space on the other side of the piston and thus enables a pressure equalization. For the case that the pass-through opening should be released at another pressure difference, only the construction of the insert must be changed or it can be exchanged for an insert of another material without the piston being otherwise changed.

It is further proposed that the insert be radially tensioned with a cylindrical ring extension between the first and the second part. By means of the cylindrical ring extension the insert can be fixed in the radial direction. Consequently in addition the insert can be so fixed against a deformation in the axial direction that the insert does not axially bulge in a pre-phase to release the opening, but instead tears at a predetermined pressure difference defined by the design of the insert without a deformation.

This abrupt tearing can also be further caused or enhanced in that the first and/or the second part exhibit a radially inward protruding collar narrowing the pass-through opening on which the insert rests. The collar acts with a pressure loading of the insert as a cutting edge which enables the tearing off of the insert by producing appropriate cutting forces in the insert.

In this case it is further proposed that the collar be placed on the second part and that the insert rests on the side of the second part facing the pressure area, and cuts the collar upon exceeding of a predetermined pressure in the pressure area. Since the second part exhibits a greater strength than the first part of the piston and the second part with the front face is supported on the inertia body, the pressure force acting on the insert is conveyed across the second part to the inertia body. Since the second part and the inertia body are already designed as appropriately rigid and with a stable shape because of their function to convey the pretensioning drive power, the insert thus is supported on a component assembly that is especially stable in shape and tears off when exceeding a predetermined pressure difference, without the point in time of the tearing off being dependent on a deformation of this component assembly.

BRIEF DESCRIPTION OF THE DRAWINGS

In the following section the invention will be explained in more detail using a preferred embodiment. Specifically recognizable in the figures are.

DETAILED DESCRIPTION OF THE INVENTION

Figure 1:
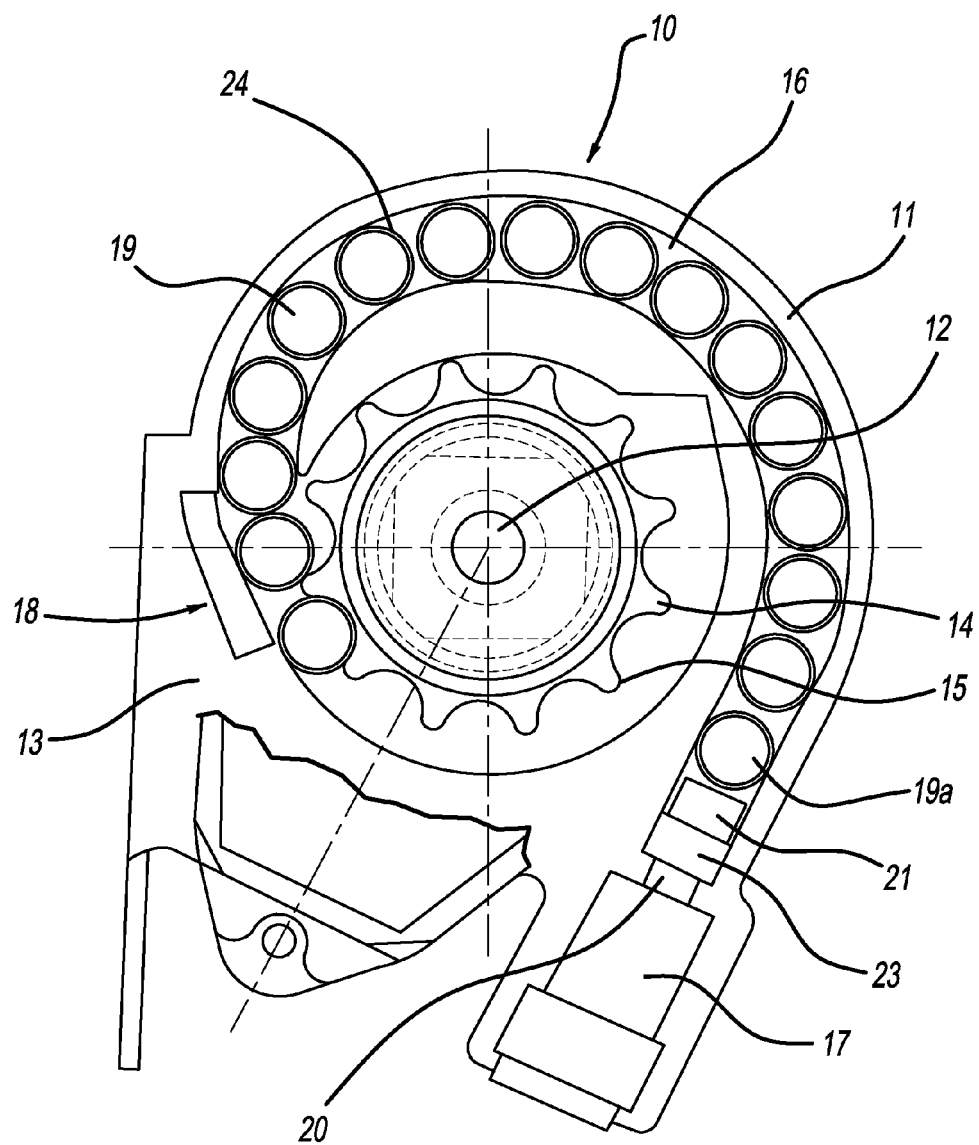
FIG. 1 shows a pretensioning device coupled to a belt roller with a piston guided in a tube.

The belt retractor schematically shown in FIG. 1 comprises a housing 11 with a side leg 13, a belt coil shaft 12 placed thereon for a safety belt strap (not illustrated), and a pretensioning device 10 acting after release on the belt spool shaft 12. The pretensioning device 10 encompasses a drive wheel 14 connected in a rotationally fixed manner with the belt spool shaft 12 which, for example, features an external gearing 15, a gas generator 17, in particular pyrotechnic type, to produce a gas pressure, and a tube 16 connecting the gas generator 17 with the belt spool shaft 12 via a drive wheel 14. The tube 16 is formed by a tube wall 24 which can be part of the housing 11 or alternatively also a separate component part.

Provided in the tube 16 is a series of metallic ball-shaped inertia bodies 19 to convey the pretensioning movement caused by the gas pressure produced by the gas generator 17 to the belt spool shaft 12 via the drive wheel 14. The belt retractor is not limited with regard to the design of the interaction area 18 between the series of inertia bodies 19 and the drive wheel 14, as well as any possible coupling devices between the drive wheel 14 and the belt spool shaft 12. For a low friction force transfer the outer diameter of the inertial body 19 is advantageously somewhat smaller than the inner diameter of the tube 16.

Provided in the tube 16 is a piston 21 only shown diagrammatically in FIG. 1, which is placed expediently in an area 23 between the gas generator 17 and the series of inertial bodies 19, meaning directly in front of the first inertial body 19a of the chain of inertia bodies 19 in the direction of force conveyance. The piston 21 closes a pressure area 20 in the tube 16 impacted by the gas generator 17 by means of a gas pressure so that the piston 21 upon the pressure impact of the pressure area 20 by the gas generator 17 can be moved to a pretensioning movement. The pretensioning movement of the piston 21 formed by the inertial bodies 19 and the drive wheel 14 is conveyed by means of the force transfer device to the belt spool roller 12 so that the belt strap is tensioned.

Figure 2:
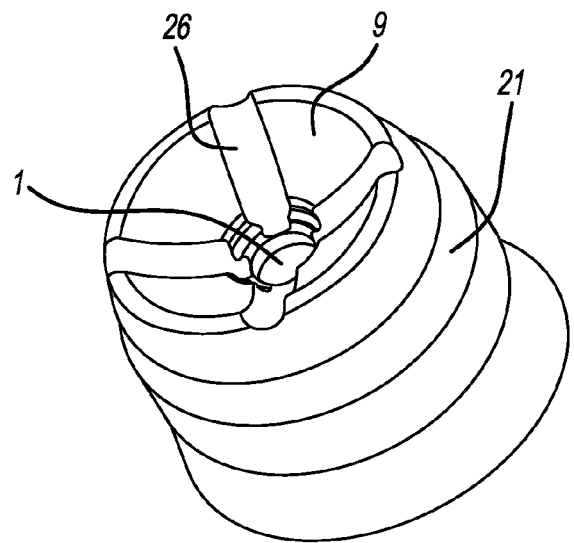
FIG. 2 shows a pretensioner piston with four recesses in the front face in an isometric view.
Figure 3:
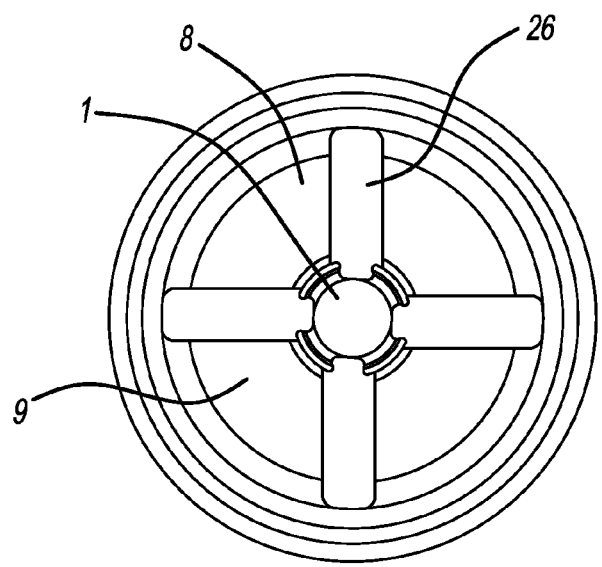
FIG. 3 shows the piston of FIG. 2 seen in the direction of the front face.

An embodiment of the inventive piston 21 with four radially symmetrical recesses positioned at a 90 degree angle to each other is shown in FIGS. 2 and 3. The recesses 26 extend in a straight line from a pass-through opening 1 placed in the center, to the radial outer edge of the piston 21.

Figure 4:
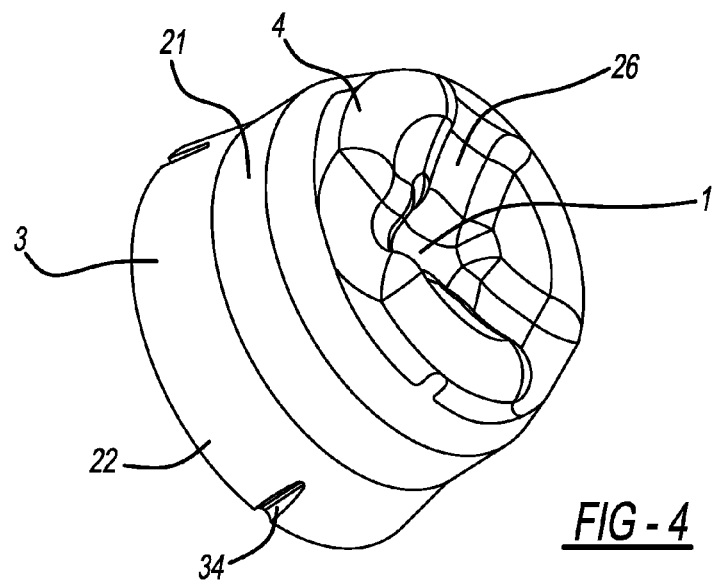
FIG. 4 shows a piston with three recesses in the front face in an isometric view.
Figure 5:
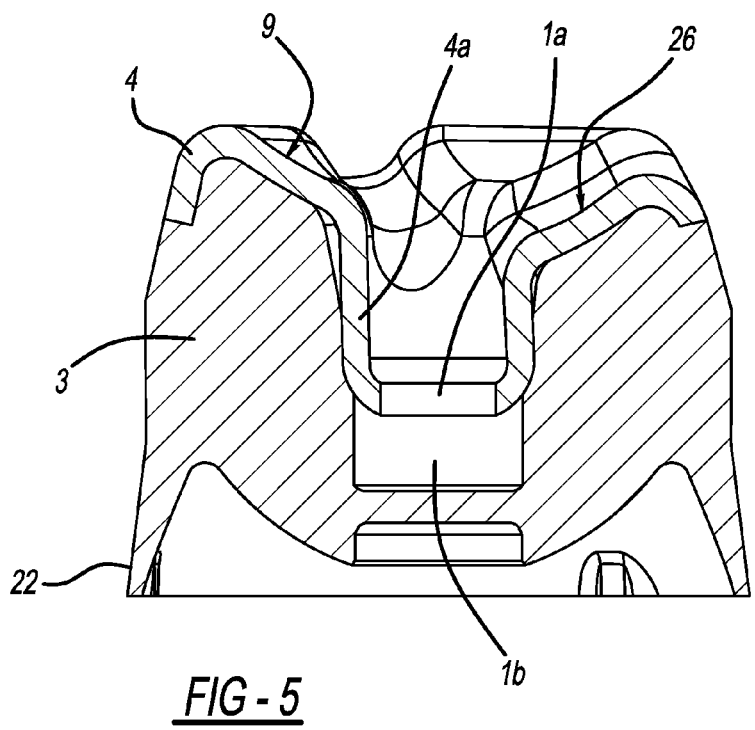
FIG. 5 is a cross-sectional view of the piston from FIG. 4.

An alternative embodiment of the piston 21 can be seen in FIGS. 4 and 5 in which the two-part piston 21 is composed of a first part 3 and a second part 4. For example, the first part 3 is made from an elastic plastic, like POM, and forms the basic body of the piston 21, while the second part 4 is constructed as a metallic deep-drawn part and forms the front face 9 of the piston 21. The second part 4 is formed in the deep-drawn process in the middle of a cylindrical section 4a and is pressed along with it into the pass-through opening 1. Furthermore, three recesses 26 are stamped in the front face 9 which are positioned at an angle of 120 degrees to each other and likewise flow into the pass-through opening 1.

Figure 6:
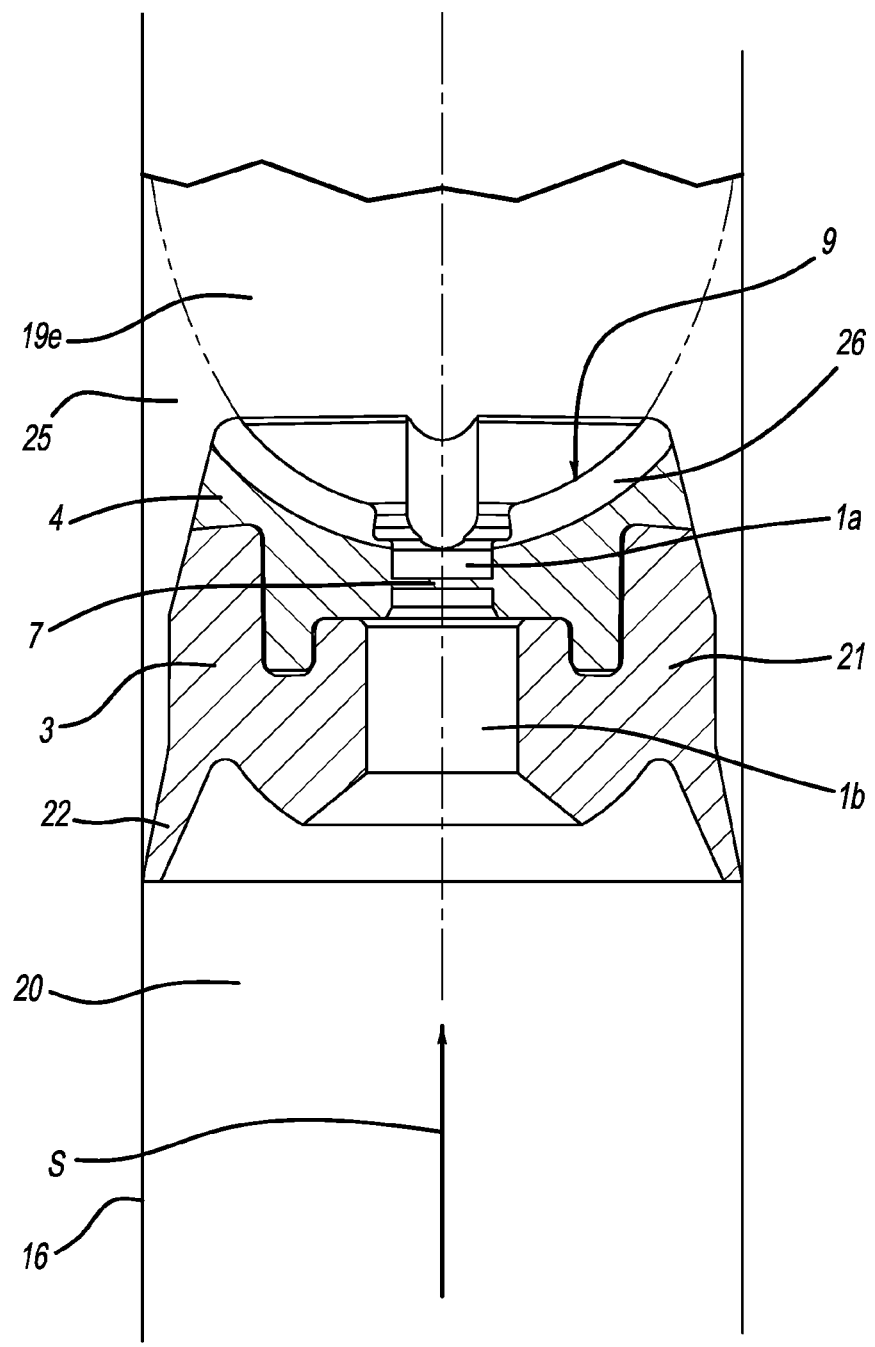
FIG. 6 shows a two-part piston with adjoining inertia body in a tube of the pretensioning device.

An additional embodiment of a piston 21 is presented in FIG. 6, and for a better understanding of the invention is illustrated in a tube 16 with an adjoining inertia body 19a. The piston 21 is also constructed in this embodiment in two pieces with a first part 3 and a second part 4. The first part 3 is provided with a sealing lip 22 which rests on the interior wall of the tube 16 to seal the pressure area 20. The second part 4 is connected with it on the side of the first part 3 facing the inertial body 19a and forms the front face 9 of the piston 21 on which the inertial body 19a rests. Recesses 26 are provided in the front face 9 of the piston 21 which extend from the pass-through opening 1 to the radial outer edge of the piston 21. The second part 4 exhibits a greater surface hardness and strength than the first part 3 so that the surface of the piston 21 is not deformed in the area of the front face 9 by the forces acting during the tensioning movement, and as a result the recesses 26 can be pressed together. The first part 3 is specifically made of a material of lesser strength and surface hardness, so that the sealing lip 22 is accordingly capable of deformation and during the pretensioning movement rests in a sealing manner on the interior wall of the tube 16, even in case of slight side movements of the piston 21 or in case of a curved course of the tube.

The pass-through opening 1 is formed by a section 1a and a section 1b, as can be seen in FIGS. 5 and 6, whereby section 1b in the embodiment in FIG. 5 and section 1a in the embodiment shown in FIG. 6 are each closed by means of a partition wall 7. Upon exceeding of a pressure in the pressure space 20 determined by the wall strength and the material of the partition wall 7, said material tears and then releases the pass-through opening 1.

After the tearing of the partition wall 7 the pressure can escape from the pressure area 20 via the pass-through opening 1 and the recesses 26 in the direction of the pretensioning movement S into the area 25 located behind the piston, without it being necessary to have a gap between the inertia body 19a and the front face 9. The over-pressure safety is thereby functionally secured even under a full loading of the pretensioning device.

Figure 7:
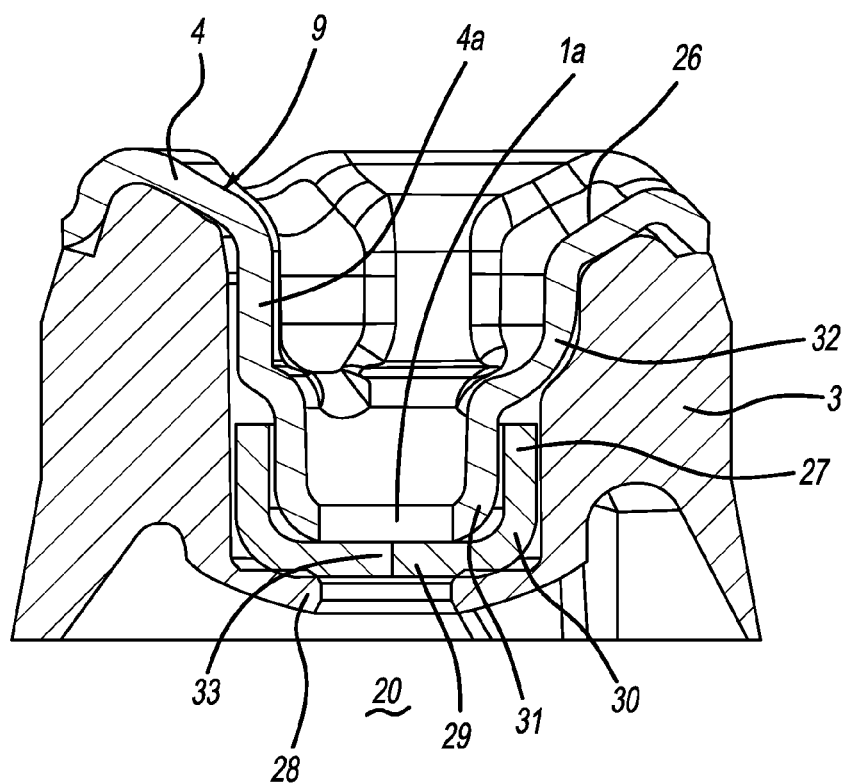
FIG. 7 shows a two-part piston with an insert provided between the parts of the piston.

FIG. 7 presents another embodiment of the piston 21 with two parts 3 and 4, between which there is an insert 30 which is constructed as a pot with a cylindrical ring extension 27 and a tear-off section 29 closing the pass-through opening 1. The insert 30 is clamped with the ring circular extension 27 in the radial direction between the first part 3 and the second part 4 and in the axial direction between the collars 28 and 31 of the first and second parts 3 and 4, thereby narrowing the pass-through opening. The insert 30 is thus rigidly clamped both in the axial as well as the radial direction between parts 3 and 4. Because of its dimensions and the use of plastic as the material, the collar 28 acts as a spring so that the collar 28 can flex somewhat upon the introduction of the insert 30 and the second part 4 without itself being destroyed or damaged.

With an increase of the pressure in the pressure area 20 and as a result an exceeding of a predetermined pressure difference of the pressures adjoining on the different sides of the insert 30, the insert 30 tears apart in the area of the tear-off section 29, whereby the tear-off begins at the edge of the collar 31 which in this case acts like a cutting edge. Since the insert 30 with the cylindrical ring extension is radially tensioned between parts 3 and 4, the deformation of the insert 30 and in particular the deformation of the tear-off section 29, is limited in the axial direction. The tear-off of the insert 30 begins at a spot of the tear-off section 29 lying on the edge of the collar 31 which then subsequently cuts along the edge of the collar 31 in the circumferential direction.

The insert 30 thereby is supported on the second part 4 which exhibits a greater strength and is supported with the front face 9 on the inertia body 19a. By means of the second part 4 the insert 30 finds an appropriate mechanical support, so that the pressure difference on insert 30 specifically results in a tearing off of the insert 30 without the second part 4 being thereby previously deformed and consequently the point in time of the tearing-off can be influenced. Both the second part 4 as well as also the insert 30 can be constructed as metallic deep-drawn parts. In each case the second part 4 should exhibit a greater stability of shape obtained by design or by selection of material than the insert 30, so that the insert 30 tears off at a predetermined pressure difference.

The insert 30 exhibits a slightly smaller outer diameter than the inner diameter of the pass-through opening 1 in the first part 3, so that the insert 30 is accommodated with free play in the pass-through opening 1 and as a result exerts no radial forces on the first part 3. Furthermore a support area 32 is constructed on the first part 3, and when the second part 4 moves in an axial direction of the piston 21, said second part rests in a form-locking manner in the area of the recesses 26, so that consequently the expected position of the second part 4 with respect to the first part 3 is determined and the pressure on the insert 30 is limited.

Furthermore, a micro-boring 33 with a width of about 0.1 mm is provided in the insert 30 in the area of the tear-off section 29. The micro-boring 33 enables pressure equalization between the pressure area 20 and the area 25 located behind the piston 21 without the tear-off section 29 having to thereby tear-off. Such pressure equalization then makes sense, for example, when the belt tensioner is activated and the pressure should then escape for a further operation of the belt retractor. By means of this arrangement of the micro-boring 33, the grooves 34 in the cover area of the piston 21 shown in FIG. 4 can be omitted. Furthermore the tear-off of the tear-off section 29 can be promoted by the micro-boring 33.

In addition, by means of the micro-boring 29 a movement of the piston 21 against the tensioning movement and against the pressure still existing in the pressure area 20 can be facilitated at the beginning of the force limitation movement. In any event pressure equalization between the pressure area 20 and the space 25 is possible because of the micro-boring 33 without the tear-off section 29 having to tear off, namely independent of exceeding of a predetermined pressure difference between the pressure in the area 25 and the pressure area 20.

While the above description constitutes the preferred embodiment of the present invention, it will be appreciated that the invention is susceptible modification, variation and change without departing from the proper scope and fair meaning of the accompanying claims.

The invention claimed is:

1. A pretensioning device for a motor vehicle safety belt system comprising a gas generator, a piston guided in a tube, which closes a pressure area in the tube that is pressurized by gas from the gas generator with a pressure wherein the piston is able to move in a pretensioning movement within the tube for tensioning the safety belt system by means of movement of an inertia body resting on a front face of the piston, the piston forming a pass-through opening releasable for flow of the gas therethrough upon exceeding of a predetermined pressure in the pressure area while blocking the flow when the pressure is below the predetermined pressure in the pressure area, and the piston further forming at least one recess in the front face, forming a flow connection from the pass-through opening to an area located axially between the piston and the inertia body while the inertia body contacts the front face.

2. A pretensioning device according to claim 1, further comprising that at least two of the recesses are provided in the front face.

3. A pretensioning device according to claim 2, further comprising that the recesses are positioned and directed to extend radially from the center of the front face to the outer edge of the front face in a symmetric manner.

4. A pretensioning device according to claim 2 further comprising that the recesses are dimensioned identically.

5. A pretensioning device for a motor vehicle safety belt system comprising a gas generator, a piston guided in a tube, which closes a pressure area in the tube that is pressurized by gas from the gas generator with a pressure wherein the piston is able to move in a pretensioning movement within the tube for tensioning the safety belt system by means of movement of an inertia body resting on a front face of the piston, the piston forming a pass-through opening releasable for flow of the gas therethrough upon exceeding of a predetermined pressure in the pressure area while blocking the flow when the pressure is below the predetermined pressure in the pressure area, and the piston further forming at least one recess in the front face, forming a flow connection from the pass-through opening to an area located between the piston and the inertia body while the inertia body contacts the front face, further comprising that the pass-through opening is positioned in the middle of the front face and at least two of the recesses run radially to an outer edge of the piston beginning from the pass-through opening.

6. A pretensioning device according to claim 2 further comprising that the area of the recesses amounts to 15%-50% of the total area of the front face.

7. A pretensioning device according to claim 1 further comprising that the piston exhibits a greater surface hardness in the area of the front face compared to the rest of the piston.

8. A pretensioning device according to claim 1 further comprising that the piston is a one-piece integral structure.

9. A pretensioning device according to claim 1 further comprising that a partition is positioned in the pass-through opening, the piston being releasable for flow of the gas therethrough upon exceeding the predetermined pressure.

10. A pretensioning device according to claim 1 further comprising that the piston is constructed in at least two parts, having a first part which rests on the internal wall of the tube and a second part forming the front face, the second part having a greater hardness than the first part.

11. A pretensioning device according to claim 10, further comprising that the second part is formed by as a metallic deep-drawn part.

12. A pretensioning device according to claim 10 further comprising that the second part forms an aperture aligned with the pass-through opening and the first part forms a partition in the pass-through opening, the partition being releasable for flow of the gas therethrough upon exceeding the predetermined pressure in the pressure area.

13. A pretensioning device according to claim 10 further comprising that an insert is provided between the first and the second parts for closing of the pass-through opening.

14. A pretensioning device according to claim 13 further comprising that the insert forms a continuously open microboring and other portions of the insert can fail to open the pass-through opening upon exceeding of the predetermined pressure in the pressure area.

15. A pretensioning device according to claim 13, further comprising that the insert forms a cylindrical ring extension which is radially clamped between the first and the second parts.

16. A pretensioning device according to claim 13 further comprising that at least one of the first and the second part forming a radially inward protruding collar which constricts the pass-through opening and the insert rests upon the collar.

17. A pretensioning device according to claim 16, further comprising that the collar is positioned in the second part and the insert rests on the side of the second part facing the pressure area and which tears off on the collar upon exceeding of the predetermined pressure in the pressure area.

\* \* \* \* \*